(12) United States Patent
Morelli et al.

(10) Patent No.: US 10,415,691 B2
(45) Date of Patent: Sep. 17, 2019

(54) INTEGRATION OF A PUMP ON A PINION SHANK

(71) Applicant: SAFRAN TRANSMISSION SYSTEMS, Colombes (FR)

(72) Inventors: Boris Morelli, Paris (FR); Stephane Prunera-Usach, Jurancon (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 92 days.

(21) Appl. No.: 15/544,424

(22) PCT Filed: Jan. 19, 2016

(86) PCT No.: PCT/FR2016/050098
§ 371 (c)(1),
(2) Date: Jul. 18, 2017

(87) PCT Pub. No.: WO2016/116694
PCT Pub. Date: Jul. 28, 2016

(65) Prior Publication Data
US 2018/0266540 A1    Sep. 20, 2018

(30) Foreign Application Priority Data

Jan. 19, 2015 (FR) ..................... 15 50406

(51) Int. Cl.
*F16H 57/04* (2010.01)
*F02C 7/36* (2006.01)

(52) U.S. Cl.
CPC ........... *F16H 57/0428* (2013.01); *F02C 7/36* (2013.01); *F16H 57/0483* (2013.01); *F16H 2700/00* (2013.01)

(58) Field of Classification Search
CPC ............ F16H 57/0428; F16H 57/0483; F16H 2700/00; F02C 7/36
See application file for complete search history.

(56) References Cited

U.S. PATENT DOCUMENTS 3,520,632 A   7/1970 Brunkhardt et al.
5,472,319 A   12/1995 Rohlfing et al.
(Continued)

FOREIGN PATENT DOCUMENTS

DE   43 30 226 C1   9/1994
EP   2 063 125 A1   5/2009
(Continued)

OTHER PUBLICATIONS

Coulson and Richardson's Chemical Engineering, vol. 1—Fluid Flow, Heat Transfer and Mass Transfer, 1999 (Year: 1999).*
(Continued)

*Primary Examiner* — Jacob S. Scott
*Assistant Examiner* — Murad Jahmani
(74) *Attorney, Agent, or Firm* — Oblon, McClelland, Maier & Neustadt, L.L.P.

(57) ABSTRACT

A device lubricates elements of an accessory drive system of an aircraft. The device includes a pinion having a pinion shank that is hollow and that has an axis of rotation, a shaft arranged inside the pinion shank and extending along the axis of rotation, a space between the shaft and the pinion shank allowing displacement of oil, an oil reservoir arranged facing the space, at a first end of the pinion shank, and an oil outlet duct arranged facing the space, at a second end of the pinion shank. The pinion shank and the shaft together form a pump and cooperate to drive the oil from the reservoir toward the oil outlet duct thanks to the rotation of the pinion shank around the shaft.

17 Claims, 3 Drawing Sheets

(56) References Cited

U.S. PATENT DOCUMENTS

Figure 1:
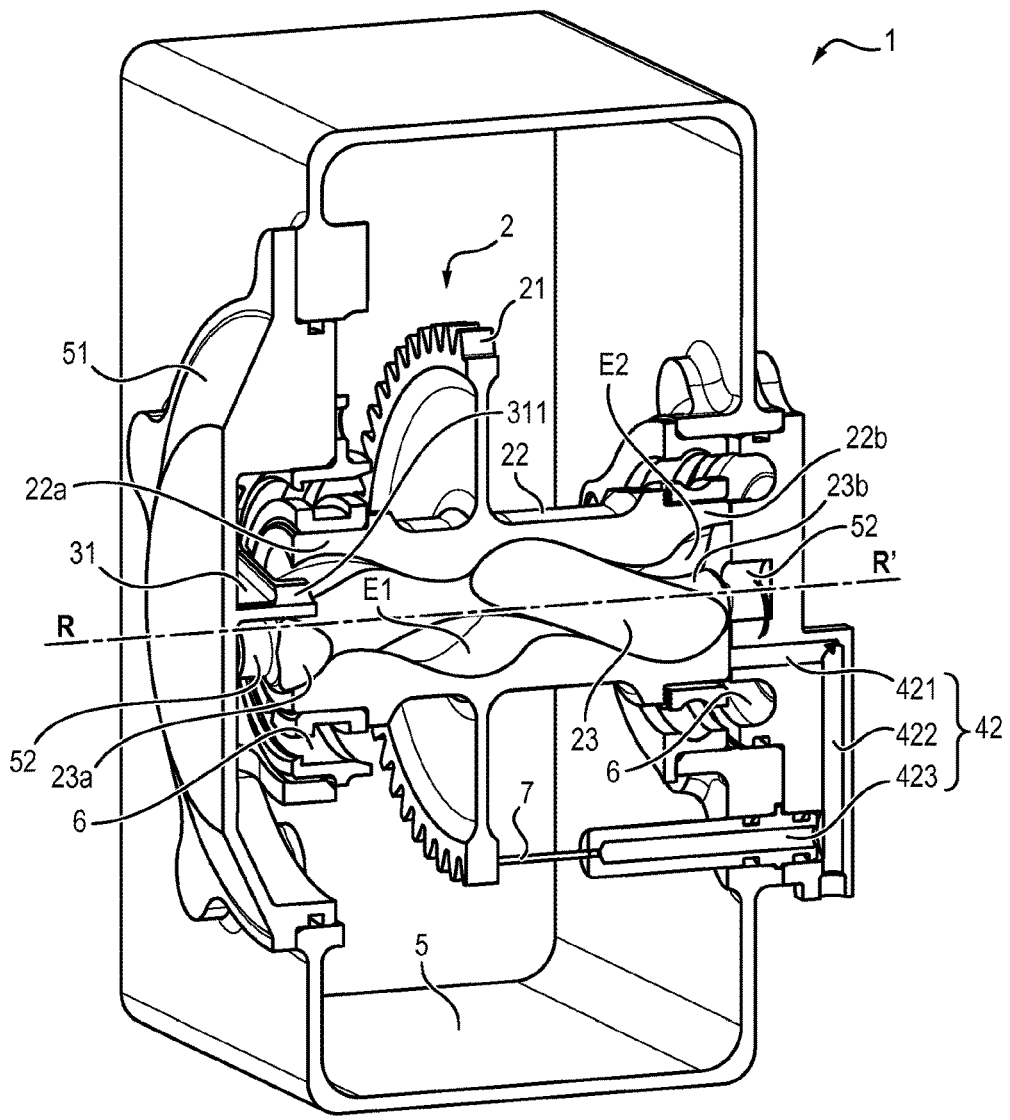

| | | | |
|---|---|---|---|
| 5,759,019 A | 6/1998 | Wood et al. | |
| 2010/0260636 A1 | 10/2010 | Grann et al. | |
| 2012/0283060 A1* | 11/2012 | Birdsall, III | B60K 23/0808 |
| | | | 475/31 |
| 2014/0030110 A1 | 1/2014 | Sinusas et al. | |
| 2015/0211544 A1 | 7/2015 | Sinuses et al. | |

FOREIGN PATENT DOCUMENTS

| | | |
|---|---|---|
| EP | 2 690 318 A1 | 1/2014 |
| GB | 1 250 040 A | 10/1971 |
| WO | WO 97/40273 A1 | 10/1997 |

OTHER PUBLICATIONS

International Search Report dated Apr. 8, 2016, in PCT/FR2016/050098 filed Jan. 19, 2016.

International Search Report and Written Opinion of the International Searching Authority dated Apr. 8, 2016 in PCT/FR2016/050098 filed Jan. 19, 2016 (with English translation of the Written Opinion and English translation of categories of cited documents, English translation of the International Search Report previously filed).

French Preliminary Search Report and Written Opinion dated Dec. 9, 2015 in Patent Application No. FR 1550406 (with English translation of categories of cited documents).

* cited by examiner

INTEGRATION OF A PUMP ON A PINION SHANK

GENERAL TECHNICAL FIELD

The invention relates to the field of lubrication of aircraft elements, particularly elements positioned on the power transmission drive chain, for example an accessory gearbox (AGE).

The mechanical power required for driving accessories (also called "equipment") is generally drawn mechanically at a propulsion unit of the aircraft. Thereafter, gear-trains make it possible to supply power to the different accessories necessary to the operation of the aircraft: generator, starter, alternator, hydraulic pumps, lubrication system, etc.

The gear-trains as well as the bearings and rolling-element bearings allow the rotation of the elements of the drive chain, requiring quasi-constant lubrication.

PRIOR ART

In the prior art, these pinions and bearings are lubricated by a pump or lubrication system supplied with power by the AGB. Nozzles spray the elements with oil which is then recovered in collectors or pockets located in a casing or a cover.

But such lubrication depends directly on the operation of the pump or the lubrication system. Thus, when the propulsion unit is stopped, lubrication does not take place, except for the oil residue still present or oil beading from the casing to the pinions.

Yet when stopped, due to the effects of "windmilling," that is the rotation of the propulsion unit due to the effect of the wind when the propulsion unit is not in operation, the pinions can be brought to rotate, and consequently need to be lubricated. Otherwise, there exists a risk that the pinions will be damaged (seizure, etc.).

The effects of "windmilling" can also be observed in flight, where the air enters the engine and the influence of the wind modifies the speed of rotation of the blades or the vanes, which can lead to a loss of lubrication.

PRESENTATION OF THE INVENTION

To compensate for the limitations mentioned above, the invention proposes a device for lubricating elements of an accessory drive system of an aircraft, comprising a pinion having a pinion shank which is hollow and which has an axis of rotation, said device being characterized in that it also comprises:
  A shaft, arranged inside the pinion shank and extending along the axis of rotation,
  A space between the shaft and the pinion shank, allowing displacement of the oil,
  An oil reservoir, arranged facing said space, at a first end of the pinion shank,
  An oil outlet duct, arranged facing the space, at a second end of the pinion shank,
wherein the pinion shank and the shaft together form a pump and cooperate to drive the oil from the reservoir toward the oil outlet duct, thanks to the rotation of the pinion shank around the shaft.

Such a device constitutes a pump that is complementary to traditional systems supplied with power by the propulsion unit of the aircraft. It takes full advantage of the rotational inertia of certain elements, when the propulsion unit is shut down, as well as their capacity to be put into motion by fluid mechanical effects, stopped or in flight, to pump oil and thus to provide lubrication of the elements.

The invention constitutes a complementary source for lubricating the elements (particularly the pinions) of a drive chain when the oil supply of the aircraft is cut off, preventing the deterioration of the elements of the aircraft (seizure, etc.).

This mode of lubrication, complementary to traditional one of lubrication systems and/or a pump, has a certain number of advantages.

This complementary source of lubrication can also act as a supplement, thus adding itself to the traditional lubrication system and/or pump.

Finally, in the event of a failure or malfunction of the traditional lubrication system (leak, pump or lubrication system stoppage, etc.), this complementary lubrication source can thus act as an alternate, replacing at least partly the lubrication which is no longer supplied by the traditional lubrication system and/or pump.

The invention also comprises the following features, taken alone or in combination:
  A first embodiment, wherein:
    the pinion shank has a helical hollow portion, and
    the shaft forms an eccentric screw with a shape complementary to that of the helical hollow portion, the pump being of the Moineau (eccentric screw) type,
  A second embodiment, wherein:
    the pinion shank has the shape of a hollow cylindrical tube, and
    the shaft comprises spirals in the shape of a thread extending radially toward the pinion shank and winding around the shaft in a direction parallel to the axis of rotation,
  the pump being a pump of the Archimedes screw type,
  A third embodiment, wherein:
    the pinion shank has the shape of a cylindrical tube inside of which are arranged spirals extending radially toward the shaft and winding around the shaft in a direction parallel to the axis of rotation and
    the shaft is cylindrical,
  the radial extension of the spirals is less than the distance between the shank and the shaft,
  the pitch of the spirals is constant,
  the pitch of the spirals decreases between the first end and the second end, so as to cause the pressure of the pumped oil to increase,
  the oil outlet duct releases the oil on a position to be lubricated, for example at the upper portion of the pinion,
  the outlet duct is connected to a nozzle which sprays the oil under pressure or operates by gravity, drop by drop.

The invention also relates to an assembly comprising a device as previously described and also comprising a casing and/or a cover, the cover being at the axis of rotation of the device.

The invention also comprises the following features, taken alone or in combination:
  the oil reservoir is a collector or a pocket integrated into the casing or into the cover,
  the reservoir is supplied by the flow of oil in the casing.

The invention relates to a unit comprising an assembly as described previously, also comprising a propulsion unit in the form of a turbine engine supplying power to the accessory drive system and allowing the pinion to be driven in rotation.

Finally, the invention relates to an aircraft comprising a device, an assembly or a unit as previously described.

PRESENTATION OF THE FIGURES

Figure 2:
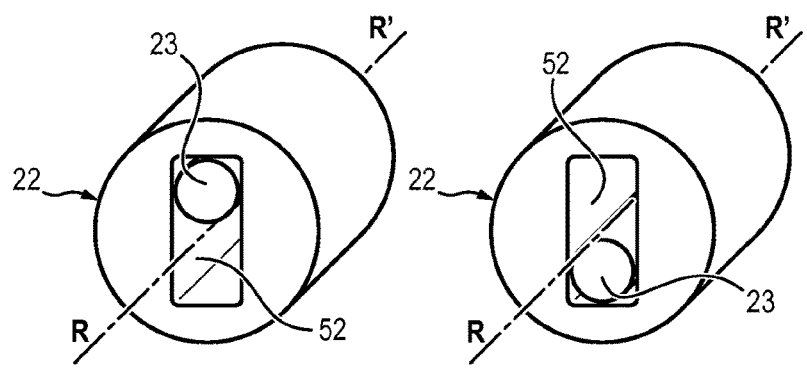
Figure 3:
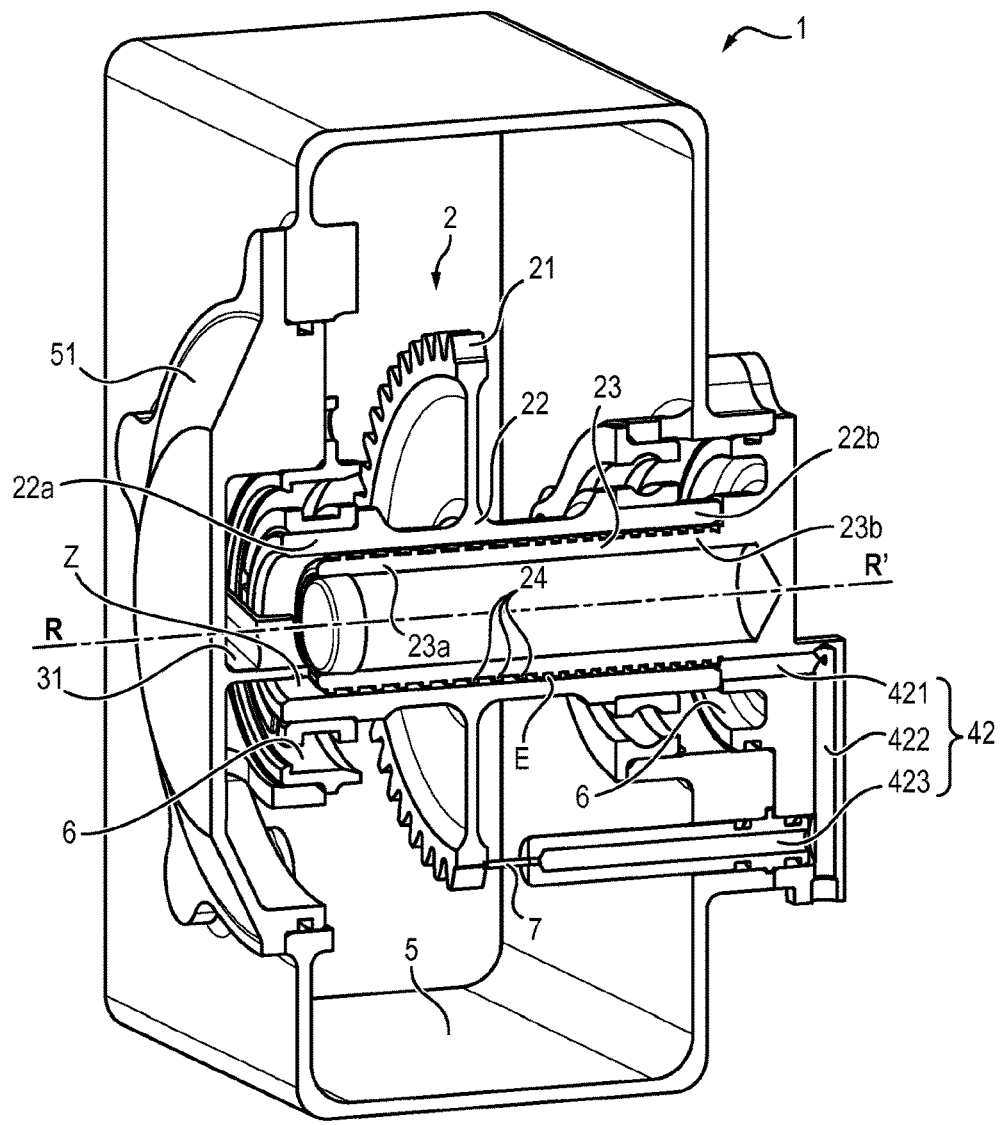
Figure 4:
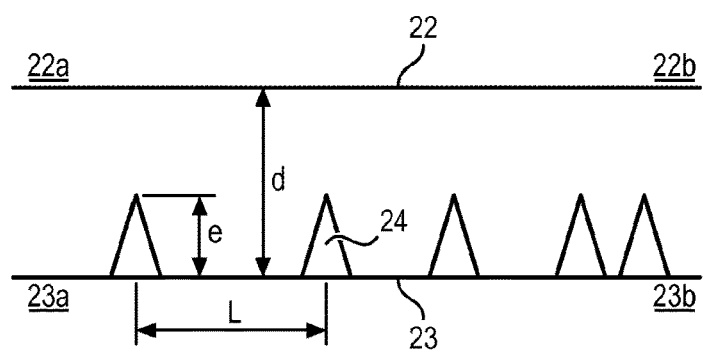
Figure 5:
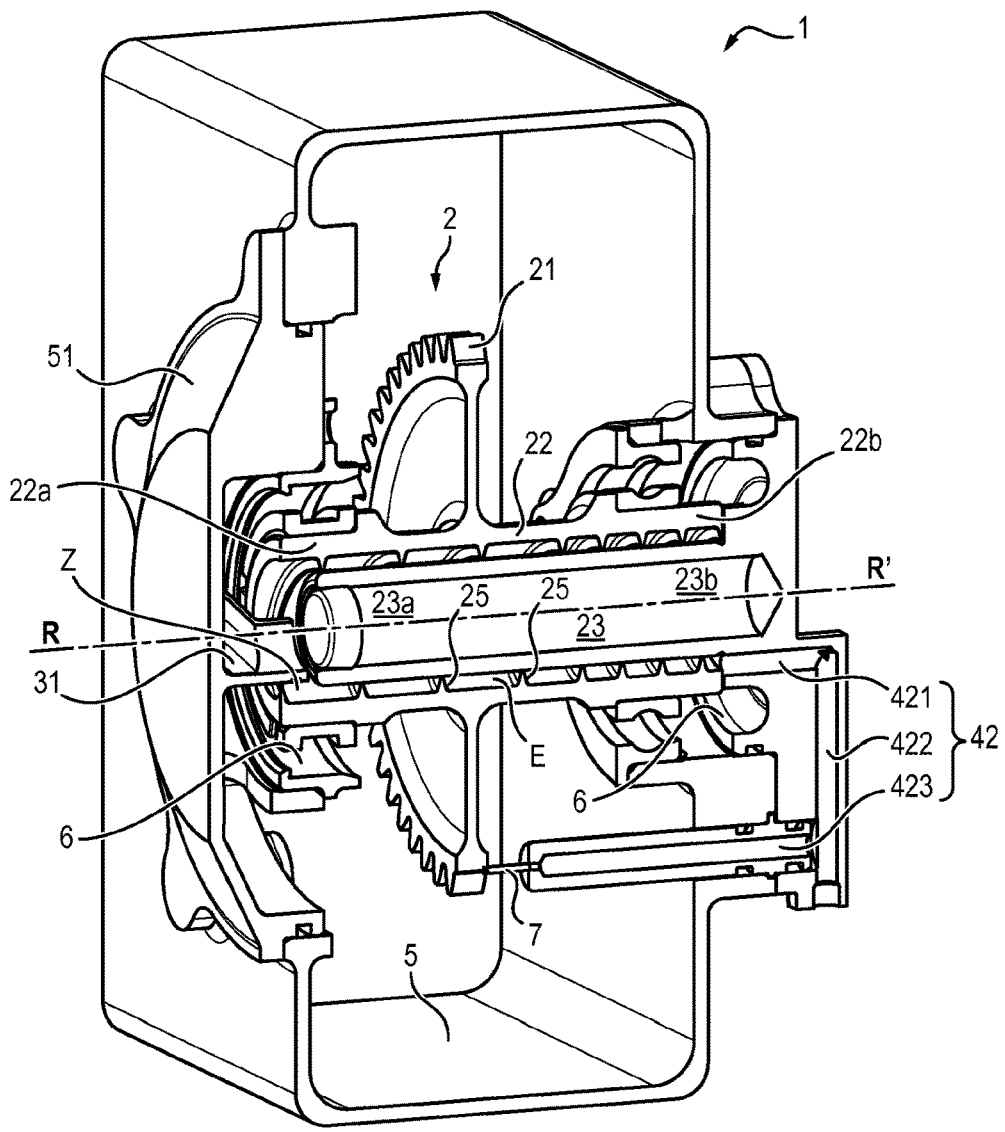
Figure 6:
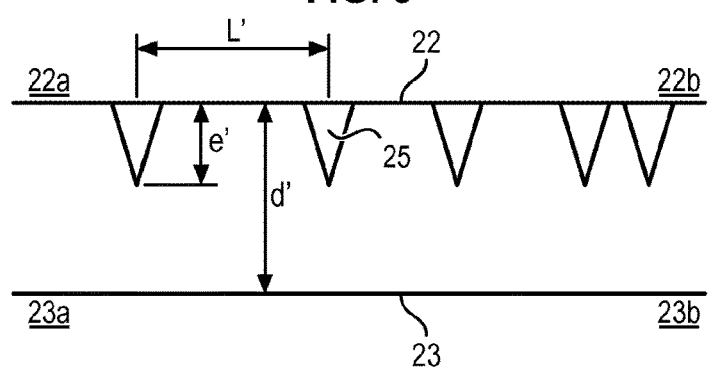

Other features, aims and advantages of the invention will be revealed by the description that follows, which is purely illustrative and not limiting, and which must be read with reference to the appended drawings, wherein:

FIGS. 1, 3, 5 show different embodiments of the invention, for three given types of pumps, FIGS. 2, 4, 6 show the respective details of the different embodiments relating to the operation of said pumps.

DETAILED DESCRIPTION

In FIGS. 1 through 6, different embodiments of the device 1 are shown.

The device 1 comprises a pinion 2, having pinion teeth 21 allowing the pinion 2 to be driven in rotation around an axis of rotation R-R'. Designated by pinion is any toothed wheel on an axis of rotation.

The pinion teeth 21 is firmly attached, by attachment or by being formed in one piece, with a hollow pinion shank 22 (designated "shank" hereafter) which extends along the axis of rotation R-R'. A pinion shank is the central portion of a pinion, through the center whereof the axis of rotation passes, and which supports a disk comprising the pinion teeth.

The pinion 2 is typically positioned on the power drive chain of an AGB, meaning that said pinion 2 drives for example an accessory (or equipment) or constitutes an intermediate element during a ratio reduction or transmission step. The AGE is itself driven by a propulsion unit of the aircraft. Said propulsion unit is preferably a turbine engine.

A shaft 23 is arranged inside the hollow pinion shank 22 along the axis of rotation R-R'. The shank 22 and the shaft 23 are arranged so that there exists a space E between them.

Thanks to the rotation of the shank 22, the shaft 23 and the shank 22 form pumping means and cooperate to drive the oil. The space E, as will be seen below, allows the displacement of the oil during pumping by making use of the rotation of the pinion shank.

An oil reservoir 31 is arranged at a first end 23a of the shaft 23 and at a first end 22a of the shank 22, facing the space E. The oil reservoir 31 makes it possible to supply the space E with oil. The oil reservoir 31 will be described in detail later.

At a second end 23b of the shaft 23 and a second end 22b of the shaft 22, still facing the space E, an oil outlet duct 42 is positioned to recover the pumped oil, and pressurized if required.

The oil outlet duct 42 is preferably located in the lower portion of the shaft, so that gravity favors the flow.

The oil outlet duct 42 can lead to various places. In one embodiment, the oil duct 42 leads to the pinion 2 and allows it to be lubricated. In other embodiments, the oil duct 42 leads to other positions to be lubricated, such as the bearings 6 or other bearings. The duct 42 will be described in detail later and different embodiments will be explained.

Thanks to the rotation of the shank 22, the shaft 23 and the shank 22, which form the pumping means, displace the oil from the oil reservoir 31 toward the oil outlet duct 42. As mentioned previously, this displacement can be accompanied by pressurization.

The device 1 is integrated without limitation in a casing 5 which protects the other elements of the aircraft, particularly from oil spray. A cover 51 firmly attached to the casing 5, by screwing for example, can be located at the end of the device 1. Alternatively, the cover 51 can form a portion of the same part as the casing 5. The pinion 2 (more precisely the shank 22) and the shaft 23 are preferably held in position by means of the casing 5 and/or the cover 51. To that end, bearings 6 are provided at the end of the device 1 and allow, while supporting the pinion 2, the rotation of the device 1. In particular, the first end 22a of the shank 22, located on the oil reservoir 31 side, and the second end 22b of the shank 22, located on the oil outlet duct 42 side, are carried by said bearings 6.

Alternatively, in a cantilever embodiment, only one end 22a, 22b of the shank 22 can be carried by the bearings 6.

At present, different embodiments of the pumping system of the device 1 will be described.

Moineau (Eccentric Screw) Type Pump

In this first embodiment, the hollow pinion shank 22 and the shaft 23 form a Moineau type of pump (see FIG. 1).

The hollow pinion shank 22 has a helical shape and the shaft is an eccentric helical shaft, having a shape complementary to the hollow helix of the shank 22. When the shaft is inserted into the pinion shank, the space E comprises a dual chain of sealed cavities E1, E2 (sometimes called alveoli). When the shank 22 rotates outside of the shaft 23, the shape of the eccentric helical shaft 23 cooperates with the helical shape of the pinion shank 22 and the alveoli travel along the shaft 23 and the shank 22 of the pump without changing shape or volume, which transfers oil from the oil reservoir 31 toward the oil outlet duct 42.

In this embodiment, due to the sealed cavities E1 and E2 which move, the oil reservoir 31 typically comprises the spout 311 which discharges into the upper portion of the space E.

The architecture of the shaft 23 and of the shank 22 is made so that the alveoli are moved from the reservoir 31 toward the outlet duct 42 when the pinion 2 drives the pump.

In this embodiment, due to the helical eccentricity of the shaft 23 and being driven in rotation by the shank 22, both ends 23a, 23b of the shaft 23 have rectilinear translation movement in a plane parallel to the axis of rotation R-R' (see FIG. 2).

To allow this movement, the casing 5 and/or the cover 51 can provide notches 52. In order to ensure sealing at these translations in the notches 52, seals are positioned (not shown in the figures).

At the second end 23b of the shaft 23, the oil must be directed toward the oil outlet duct 42. The casing 5 is preferably adapted for this purpose.

The operation of the pump is said to be volumetric. There is no pressurization, or only low pressurization.

The pump delivers discontinuous volumes of fluid.

Pump of the Archimedes Screw Type

In this second embodiment, the hollow pinion shank 22 and the shaft 23 form a pump of the Archimedes screw type (see FIG. 3).

The hollow pinion shank 22 forms a cylindrical tube and the shaft 23 is a cylindrical tube centered on the axis of rotation R-R'. The shaft 23 comprises spirals 24 extending radially in the direction of the shank 22 on its external surface, winding around the shaft 23 along the axis of rotation R-R', in the shape of a thread for example.

The shaft 23 is fixed in the device 1 while the shank 22 rotates. To this end, the shaft 23 is firmly attached to the casing 5 or the cover 51, either on the side of the first end 23a or on the side of the second end 23b (as shown in FIG. 3), and the shank 22 is driven by the pinion teeth 21. By comparison with a traditional screw type pump wherein the shank (the stator) is fixed, and the shaft (the rotor) is in rotation, here the pump is inverted. Nevertheless, the relative movement of the shank 22 with respect to the shaft 23 remains the same and the pump functions in a similar fashion. The shaft 23 can be attached to the casing 5 or be formed with it in one piece.

In this embodiment, typically the shank is extended axially along the axis R-R' further than the first end 23a of the shaft 23, so that the reservoir can discharge directly into the space E.

The winding direction of the spirals 24 is selected so that for a given rotation of the pinion 22, the device actually acts as a pump from the reservoir 31 to the oil outlet duct 42.

Designated "e" is the radial extension of the spirals 24, "d" the distance between the shaft 23 and the shank 22, "L" the pitch between two spirals 24 along an axis parallel to the axis of rotation R-R' (see FIG. 4).

According to one preferred type of variant, the radial extension e is less than the distance d, so that there remains a free clearance at the interior surface of the shank 22. Along a plane normal to the axis of rotation R-R', the space E is not therefore divided into several portions.

Due to the rotation of the shank 22 and the centrifugal force, the oil is pressed against the interior surface of the shank 22. Consequently, not all the oil is directly driven by the spirals 24. The latter contribute to favor the displacement of the oil, the viscosity of the oil then allowing displacement by driving.

According to a second type of variant, several values of the pitch L can be selected.

In a first case, the pitch between two spirals 24 is constant.

In a second case, the pitch L between two spirals 24 is reduced as the oil outlet duct 42 is approached. The reduction is preferably progressive along the shaft 23 (FIG. 4).

This reduction allows an increase in the pressure of the oil.

The Adapted Screw Pump

In this third embodiment, the hollow pinion shank 22 and the shaft 23 again form a screw pump (see FIG. 5).

The hollow pinion shank 22 form a cylindrical tube and the shaft 23 is a cylindrical tube centered on the axis of rotation R-R'. The hollow pinion shank 22 comprises spirals 25 on its internal surface extending radially in the direction of the shaft 23 while winding around the internal surface of the shank 22 along the axis of rotation R-R', for example in the shape of a thread.

The shaft 23 is fixed in the device 1 while the shank 22 rotates. To this end, the shaft 23 is firmly attached to the casing 5 or the cover 51, and the shank 22 is driven by the pinion teeth.

In this embodiment, typically the shank is extended axially along the axis R-R' further than the first end 23a of the shaft 23, so that the reservoir is able to discharge directly into the space E.

The winding direction of the spirals 24 is selected so that for a given rotation of the pinion 22, the device actually acts as a pump from the reservoir 31 toward the oil outlet duct 42.

Designated "e'" is the radial extension of the spirals 24, "d'" the distance between the shank 22 and the shaft 23, "L'" the pitch between two spirals 25 along an axis parallel to the axis of rotation R-R' (see FIG. 6).

According to the first preferred type of variant, the radial extension e' is less than the distance d', so there remains a free clearance at the shaft 23. Along a plane normal to the axis of rotation R-R', the space E is therefore not divided into several portions.

Due to rotation of the shank 22 and the centrifugal force, the oil is pressed against the interior surface of the shank 22.

Consequently, the majority of the oil is directly driven by the spirals 25. The remaining oil, closer to the shaft 23, is essentially driven by viscosity.

According to the same second type of variant, several values of the pitch L' can be selected.

In a first case, the pitch L' between two spirals 25 is constant.

In the second case, the pitch L' between two spirals 25 is reduced when the oil outlet duct 42 is approached. The reduction is preferably progressive along the shank 22 (FIG. 6).

This reduction allows the pressure of the oil to be increased.

In the two embodiments using screws (Archimedes type and adapted type), the profile of the spirals 24, 25 of the thread shown in FIGS. 4, 6 is not limiting. This can take the shape of crenellations, or of non-isosceles triangles, meaning that the spiral 24, 25 of the thread can have a form favoring a direction of flow of the oil, particularly by being inclined in the direction of the oil outlet duct 42.

Moreover, due to the viscosity of the oil, the spirals 24, 25 essentially have an overall driving role.

At present, certain elements of the device will be described in more detail. These elements apply to all the embodiments.

So that the reservoir 31 can discharge into said space E, the first end 22a of the shank 22 is extended axially, along the axis R-R' and in the direction of the oil reservoir 31, farther than the first end 23a of the shaft 23, so that a portion of the reservoir 31 penetrates into the volume defined by the cylinder of the shank 22 to define a discharge zone Z. In addition, when the device 1 is installed on an aircraft, the oil reservoir 31 is located at least in part higher than the space E defined between the shaft 23 and the shank 22, so as to be able to discharge by gravity into said space E.

Alternatively, the shaft 23 and the shank 22 can have similar lengths at the discharge zone Z, that is the first ends 22a, 23a of the shank 22 and the shaft 23 are terminated at substantially the same place. In this case, the oil reservoir 31 can comprise a spout 311 which penetrates into the space E between the shank 22 and the shaft 23. Preferably, the spout 311 discharges into the upper portion of the space E.

The oil reservoir 31 is typically in the form of a pocket or a collector. The oil reservoir 31 is advantageously integrated into the casing 5 or the cover 51.

Supplying the oil reservoir 31 can be accomplished by runoff of the oil inside the casing 5. In fact, the lubrication of the pinion 2 drives oil sprays onto the walls of the casing 5 by centrifugal force. The drops of oil thus sprayed run off along the wall and are recovered at the collector forming the oil reservoir 31.

Alternatively, it is possible to provide a specific supply to the oil reservoir 31, for example by means of a dedicated nozzle. The oil reservoir 31 is preferably dimensioned to contain a sufficient quantity of oil to allow lubrication to continue when the propulsion unit is stopped.

More generally, the reservoir 31 can be replaced by an oil supply. Nevertheless, it is preferable to have a stock of oil.

The oil outlet duct 42 can form a part of the casing 5. It is possible to distinguish two principal modes of operation of the oil outlet duct 42. Generally, the oil duct 42 can comprise a recovery portion 421, a transmission portion 422 and a discharge portion 423.

The recovery portion 421 is preferably situated facing the second end 22b of the shank 22, substantially at the same level, and in the lower portion of the shank 22 to take advantage of gravity flow.

A system of seals (not shown) is provided in the junction to limit leakage.

In a first embodiment, the transmission portion 422 lifts the oil to the upper portion of the pinion and discharges the oil there, drop by drop, so as to lubricate the pinion 2 by gravity flow. Thus, it is not necessary to lift the oil under very high pressure: it is sufficient to overcome the hydrostatic pressure of the transmission portion 422. The first embodiment is preferably used for the embodiment with a Moineau (eccentric screw) type pump.

In a second embodiment, when the oil is pressurized, the discharge portion 423 can comprise a nozzle 7 which sprays the pinion 2 with oil. The spraying is typically accomplished in the lower portion of the pinion 2.

The second embodiment can be used when the oil is pressurized by the pump as in certain variants of the screw type pump.

The oil outlet duct 42 can also contribute to lubricating the bearings 6 or any other bearing present in the AGb, more generally any position requiring lubrication.

Alternatively, the oil outlet duct 42 can pass through the casing 5 to lubricate other elements of the AGB.

Due to the architecture of the system and the pressure levels involved, the invention is particularly pertinent to local lubrication, that is in proximity to the pinion 2. By proximity is meant a distance such that the device 1 can transport the oil over this entire distance. According to an advantageous embodiment of the invention, it can even be self-lubrication, because the pinion 2 supplies the device 1 which lubricates it.

Regardless of the element lubricated, lubrication can take place either by pouring drop-by-drop, or by spraying oil under pressure (by means of a nozzle for example).

The invention applies to any dimensioning of the pinion 2. In fact, the principle of a pump integrated with the hollow pinion shank 22 can be generalized to any type of shank 22 and shaft 23 diameter.

Similarly, the dimensioning of the elements composing the pump (diameter of the shaft, number of spirals, etc.) can be adapted depending on needs.

In an accessory drive system, several devices 1 are provided for and mesh with one another.

In particular, the device 1 makes it possible to transmit power and/or to reduce a ratio to supply an accessory.

The invention claimed is:

1. A device for lubricating elements of an accessory drive system of an aircraft, comprising:
    a pinion having a pinion shank that is hollow and that has an axis of rotation;
    a shaft arranged inside the pinion shank and extending along the axis of rotation;
    a space between the shaft and the pinion shank allowing displacement of oil;
    an oil reservoir arranged facing said space, at a first end of the pinion shank; and
    an oil outlet duct arranged facing the space, at a second end of the pinion shank,
    wherein the pinion shank and the shaft together form a pump and cooperate to drive the oil from the reservoir toward the oil outlet duct thanks to the rotation of the pinion shank around the shaft.

2. The device according to claim 1, wherein:
    the pinion shank has a helical hollow portion,
    the shaft forms an eccentric screw with a shape complementary to that of the helical hollow portion, and
    the pump is of a Moineau (eccentric screw) type.

3. The device according to claim 1, wherein:
    the pinion shank has the shape of a hollow cylindrical tube,
    the shaft comprises spirals in the shape of a thread extending radially toward the pinion shank and winding around the shaft in a direction parallel to the axis of rotation, and
    the pump is a pump of an Archimedes screw type.

4. The device according to claim 1, wherein:
    the pinion shank has the shape of a cylindrical tube inside of which spirals are arranged extending radially toward the shaft and winding around the shaft in a direction parallel to the axis of rotation, and
    the shaft is cylindrical.

5. The device according to claim 3, wherein the radial extension of the spirals is less than a distance between the shank and the shaft.

6. The device according to claim 4, wherein a pitch of the spirals is constant.

7. The device according to claim 3, wherein a pitch of the spirals decreases between a first end and a second end, so as to cause pressure of the pumped oil to increase.

8. The device according to claim 1, wherein the oil outlet duct releases the oil on a position to be lubricated.

9. The device according to claim 8, wherein the position to be lubricated is at an upper portion of the pinion.

10. The device according to claim 1, wherein the outlet duct is connected to a nozzle which sprays the oil under pressure or operates by gravity, drop by drop.

11. An assembly comprising:
    the device according to claim 1; and
    at least one of a casing and a cover, the cover being at the axis of rotation of the device.

12. The assembly according to claim 11, wherein the oil reservoir is a collector or a pocket integrated into the casing or into the cover.

13. The assembly according to claim 11, wherein the reservoir is supplied by the flow of oil in the casing.

14. A unit comprising:
    the assembly according to claim 11;
    a propulsion unit in the form of a turbine engine supplying power to the accessory drive system and allowing the pinion to be driven in rotation.

15. An aircraft comprising:
    the device according to claim 1.

16. The device according to claim 1, wherein the pinion shank and the shaft together form a pump and the pinion shank is configured to rotate with respect to the shaft to drive the oil from the reservoir toward the oil outlet duct.

17. The assembly according to claim 11, wherein the shaft is fixed to the casing and the shank is free to rotate with respect to the shaft and casing.

* * * * *